(12) United States Patent
Duggan et al.

(10) Patent No.: US 7,872,735 B2
(45) Date of Patent: Jan. 18, 2011

(54) METHOD AND APPARATUS FOR REFERENCING A MEMS DEVICE

(75) Inventors: Philip Duggan, Ottawa (CA); Jinxi Shen, San Ramon, CA (US); Douglas E. Crafts, Los Gatos, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 386 days.

(21) Appl. No.: 12/164,826

(22) Filed: Jun. 30, 2008

(65) Prior Publication Data
US 2009/0009752 A1    Jan. 8, 2009

Related U.S. Application Data

(60) Provisional application No. 60/948,309, filed on Jul. 6, 2007.

(51) Int. Cl.
    *G01N 21/00*    (2006.01)
(52) U.S. Cl. ............................. 356/72; 356/218; 356/445
(58) Field of Classification Search .............. 356/72–73, 356/218, 445
See application file for complete search history.

(56) References Cited

U.S. PATENT DOCUMENTS

| | | | |
|---|---|---|---|
| 6,097,858 A | 8/2000 | Laor | 385/16 |
| 6,768,571 B2 | 7/2004 | Azarov et al. | 359/236 |
| 6,958,850 B2 | 10/2005 | Sane et al. | 359/298 |
| 6,985,271 B2 | 1/2006 | Yazdi et al. | 359/214 |
| 7,362,925 B2 | 4/2008 | Miyata et al. | 385/14 |
| 7,535,563 B1 * | 5/2009 | Chen et al. | 356/237.5 |

* cited by examiner

*Primary Examiner*—Tarifur Chowdhury
*Assistant Examiner*—Abdullahi Nur
(74) *Attorney, Agent, or Firm*—Matthew A. Pequignot; Pequignot + Myers LLC (57) ABSTRACT

A method and an apparatus for calibrating a MEMS actuator of a hybrid MEMS-PLC optical switch or router is described. Two calibrating waveguides, embedded monolithically adjacent to the waveguides that provide the PLC output functions, are used for referencing a MEMS mirror tilt angle by maximizing optical coupling of light, reflected off the MEMS mirror, into one or each of the two calibrating waveguides. The input light is provided by either a waveguide carrying a live optical signal, or by a special input waveguide, coupled to an LED, for providing a calibrating light. Two emitting waveguides, embedded monolithically adjacent to the waveguides that provide the PLC input functions, can be used.

22 Claims, 10 Drawing Sheets

METHOD AND APPARATUS FOR REFERENCING A MEMS DEVICE

CROSS-REFERENCE TO RELATED APPLICATIONS

The present invention claims priority from U.S. Patent Application No. 60/948,309 filed Jul. 6, 2007 entitled "MEMS PLC Based Angular Referencing Scheme", which is incorporated herein by reference.

TECHNICAL FIELD

The present invention is related to optical devices employing micro-electro-mechanical systems (MEMS), and in particular to methods of referencing of MEMS utilized in such devices.

BACKGROUND OF THE INVENTION

Fiberoptic communication systems frequently require optical signals, carried by optical fibers, to be switched and routed from one fiber to another. Recently, micro-electro-mechanical systems (MEMS) have found a widespread use in devices that switch light between input and output optical fibers. MEMS are fabricated on a silicon substrate using modified semiconductor fabrication technologies, normally used to make electronics. Many MEMS used for optical switching contain electrostatically actuated tiltable micro-mirrors.

Another recent trend in fiberoptic communication systems is to provide an optical switching function that is wavelength selective. For example, a single optical fiber can carry many optical signals at various wavelengths. Wavelength selective switching devices allow one to route these signals between a set of optical fibers depending on the wavelength of the signal, which affords a great flexibility to a network designer whose task it is to vary available bandwidth depending upon demand at a particular geographical region of the network. Arrayed waveguide gratings (AWG) and other types of planar lightwave circuits (PLC) are frequently used for splitting the signals at various wavelengths into different optical fibers or optical waveguides.

Hybrid optical devices that utilize free-space optical configurations and PLCs can have performance advantages over standalone PLC devices. In particular, MEMS mirrors or mirror arrays can be used to perform optical switching functions. Free-space switching technology advantageously provides higher extinction ratio than purely PLC-based optical switches. Furthermore, hybrid switch arrays can be built into a comparatively small footprint using micro-optics.

One disadvantage of MEMS mirrors is their long-term instability. There are several physical mechanisms which can degrade the pointing accuracy of a MEMS mirror. Since MEMS are generally electrostatically actuated, typically using a parallel plate capacitor structure, a small change in the accumulated charge due to slow charge migration or small changes in the electrical properties of the structure can lead to drift of a MEMS mirror tilt angle. The mirrors themselves are very thin, and deposition of a reflective material onto the mirror can result in mechanical stresses which deflect the mirror over time.

In order to stabilize a MEMS mirror, prior art devices use control circuits employing feedback loops which minimize an error signal. The devices are designed so that, when the error signal is minimized, the MEMS mirror is tilted nearly perfectly, so that a required function, e.g. a switching function, is realized. For instance, in U.S. Pat. No. 6,958,850 by Sane et al., and in U.S. Pat. No. 6,985,271 by Yazdi et al., which are incorporated herein by reference, an embedded capacitive sensor was used in a feedback control loop for precise control of electrostatically actuated micro-mirrors operating at a wide tilting angle range. Further, in U.S. Pat. No. 6,768,571 by Azarov et al., which is incorporated herein by reference, an embedded micromirror tilt angle sensor, including capacitive, piezo-resistive, piezo-voltage, or a photo-sensor is taught as a practical source of the error signal.

The solutions to the problem of degradation in performance of MEMS devices based on embedded sensors of MEMS mirror tilt share common drawbacks. Measuring a MEMS mirror tilt angle with an embedded sensor is an indirect technique, which, in addition to requiring an independent calibration, cannot take into account instability sources from outside of the MEMS chip, such as shifts of outside optical elements or fibers due to a temperature change or aging. In addition, embedding a sensor complicates a MEMS design, with the required accuracy of micromirror tilt being sometimes difficult to achieve.

A more direct technique has been described in the prior art. In U.S. Pat. No. 6,097,858 by Laor, which is incorporated herein by reference, an optical switch control system is described comprising auxiliary light sources and receivers for steering an optical beam between two optical fibers. Alternatively, the receiving optical fiber itself, equipped with an optical tap splitting off a small fraction of light from the receiving optical fiber to a photodetector, can be used in a feedback loop instead of a bulk receiver.

The optical feedback techniques of this prior art suffer from being bulky and difficult to implement, especially on a large number of emitting and/or receiving optical fibers. Placing a large number of position sensitive detectors such as a charge coupled device (CCD) or a quadrant detector into an optical switch module is impractical. An alternative in-fiber tracking systems require one to implement an optical tap and a photodetector on each receiving optical fiber. Tapping off a portion of the signal increases insertion loss for the signal going through the module, which is detrimental.

The MEMS control apparatus of present invention attempts to obviate the abovementioned drawbacks. It employs a direct measurement technique, which takes into account not only a long-term MEMS drift, but also a drift of the optomechanical package comprising it. It is compact, simple to implement, and does not require tapping of output waveguides, or any modification of the MEMS array used.

SUMMARY OF THE INVENTION

In accordance with the present invention, there is provided a method of calibrating a micro-electro-mechanical (MEMS) device comprising a MEMS mirror, for reflecting light, and a MEMS actuator, for tilting the MEMS mirror in response to an applied voltage having a voltage value, the method comprising:

providing m emitting waveguides for emitting light, wherein m is an integer positive number;

providing n receiving waveguides for receiving light, wherein n is an integer positive number, and wherein each receiving waveguide has two first and second ends, and wherein the first end of each receiving waveguide is available for receiving light, and wherein the second end of each receiving waveguide is optically coupled to a photodetector for measuring the power of light impinging thereon;

providing a coupler for coupling a light emitted by any one of the m emitting waveguides to the MEMS mirror, and for coupling the light reflected from the MEMS mirror into a particular of the n receiving waveguides in dependence upon an angle of tilt of the MEMS mirror;

applying up to m*n voltage values to the MEMS actuator, wherein m*n>1, and, for each voltage value applied, measuring the power of light emitted from one of m emitting waveguides and coupled into one of n receiving waveguides, upon application of said voltage values, wherein said powers of light are measured using the respective photodetectors;

determining a relationship between an angle of tilt of the MEMS mirror and a voltage applied to the MEMS actuator, from the applied voltage values and the measured values of optical power.

In accordance with another aspect of the invention there is further provided a method for lessening an insertion loss of an optical module including: a mirror and an actuator for tilting said mirror in response to applying a control signal to the actuator; an emitting planar array of waveguides for emitting light; a receiving planar array of waveguides for receiving light; and a coupler for coupling a light emitted by a waveguide of the emitting planar array to the mirror, and for coupling the light reflected from the mirror to a waveguide of the receiving planar array, wherein the module is usable for routing an optical signal from a waveguide of the emitting planar array into a waveguide of the receiving planar array, wherein the method comprises:

dithering the control signal applied to the actuator and measuring AC and DC components of the power of light coupled into any of two, or both outer waveguides of the receiving planar array; determining, from said AC and DC components of the power of light, a value of a control signal which, when applied, would reduce the insertion loss of the optical module; and applying the control signal of said value to the actuator;

wherein the actuator is selected from a group consisting of: a micro-electro-mechanical (MEMS) actuator; a galvo actuator; and a piezo actuator.

In accordance with yet another aspect of the invention there is further provided a MEMS actuated optical module comprising:

an emitting waveguide for emitting light;

a planar array of receiving waveguides for receiving the light from the emitting waveguide;

a MEMS device including a MEMS mirror and a MEMS actuator, for tilting the MEMS mirror in response to a voltage applied;

a coupler for coupling light from the emitting waveguide to the MEMS mirror, and for coupling the light reflected from the MEMS mirror to a selected one of the waveguides of the planar array of receiving waveguides in dependence upon an angle of tilt of the MEMS mirror, wherein said coupling is characterized by a coupling loss; and a calibration unit for calibrating the optical module, comprising:

first and second calibrating waveguides disposed on both sides of the planar array of receiving waveguides, wherein each said calibrating waveguide has first and second ends, wherein the first end of each calibrating waveguide is available for receiving light, and wherein the second end of each calibrating waveguide is optically coupled to a photodetector for measuring the power of light impinging thereon, and a suitably programmed processor for calibrating the MEMS device.

In accordance with yet another aspect of the invention there is further provided a MEMS actuated optical module comprising:

a planar array of emitting waveguides for emitting light;

a planar array of receiving waveguides for receiving the light from the planar array of emitting waveguides;

a MEMS device including a MEMS mirror and a MEMS actuator, for tilting the MEMS mirror in response to a voltage applied;

a coupler for coupling light from a selected one of the waveguides of the planar array of emitting waveguides to the MEMS mirror, and for coupling the light reflected from the MEMS mirror to a selected one of the waveguides of the planar array of receiving waveguides in dependence upon an angle of tilt of the MEMS mirror, wherein said coupling is characterized by a coupling loss; and a calibration unit for calibrating the optical module, comprising:

first and second emitting calibrating waveguides disposed on both sides of the planar array of emitting waveguides, wherein each said emitting calibrating waveguide has first and second ends, wherein the first end of each emitting calibrating waveguide is available for emitting light, and wherein the second end of at least one of the emitting calibrating waveguides is optically coupled to a light emitting diode for providing an output light;

first and second receiving calibrating waveguides disposed on both sides of the planar array of receiving waveguides, wherein each receiving calibrating waveguide has first and second ends, wherein the first end of each receiving calibrating waveguide is available for receiving light, and wherein the second end of each receiving calibrating waveguide is optically coupled to a photodetector for measuring the power of light impinging thereon, and a suitably programmed processor for calibrating the MEMS device.

BRIEF DESCRIPTION OF THE DRAWINGS

Exemplary embodiments will now be described in conjunction with the drawings in which.

DETAILED DESCRIPTION OF THE INVENTION

Figure 1:
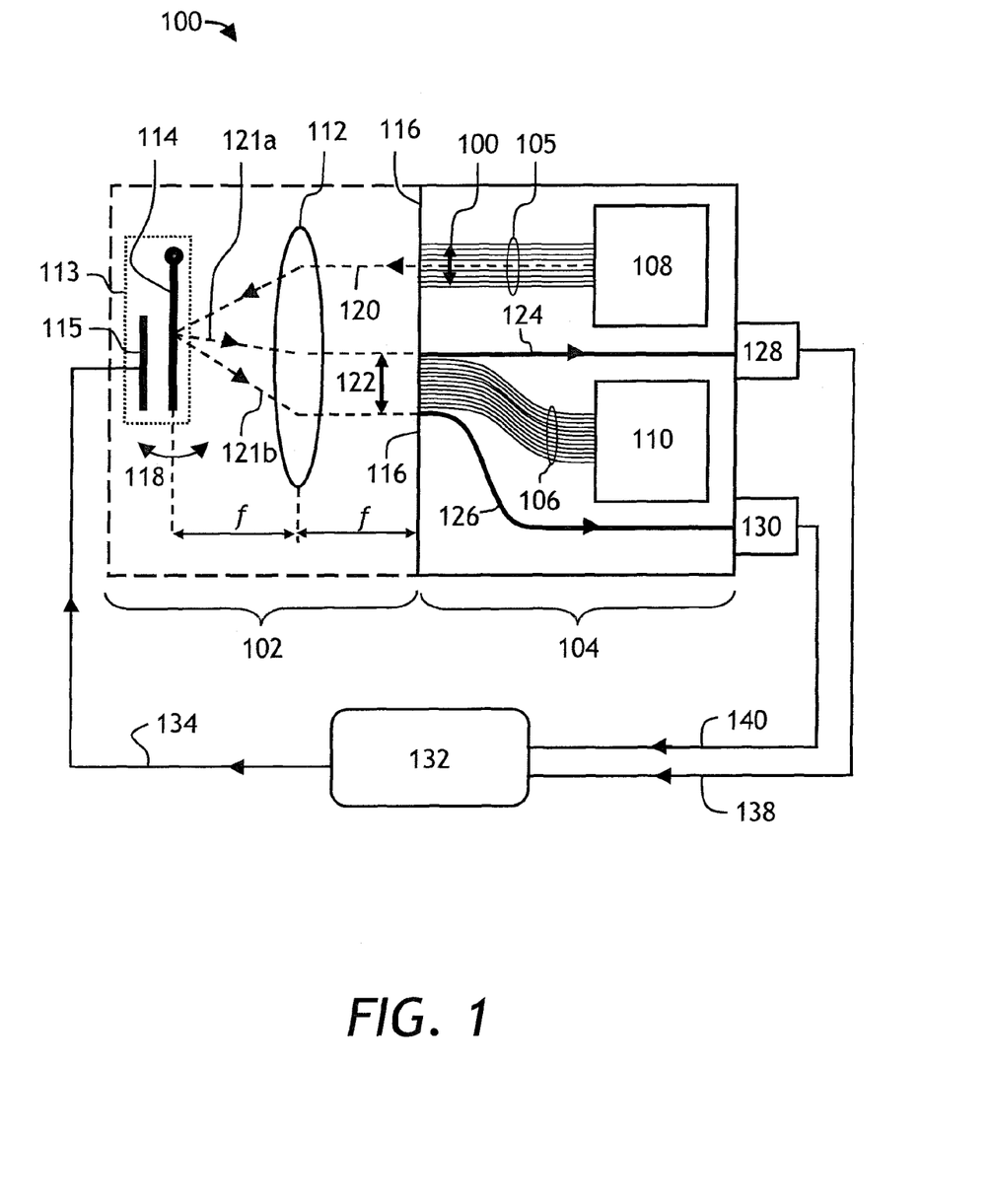
FIG. 1 is a circuit diagram of a hybrid MEMS-PLC optical module according to one preferred embodiment of present invention.
Figure 2:
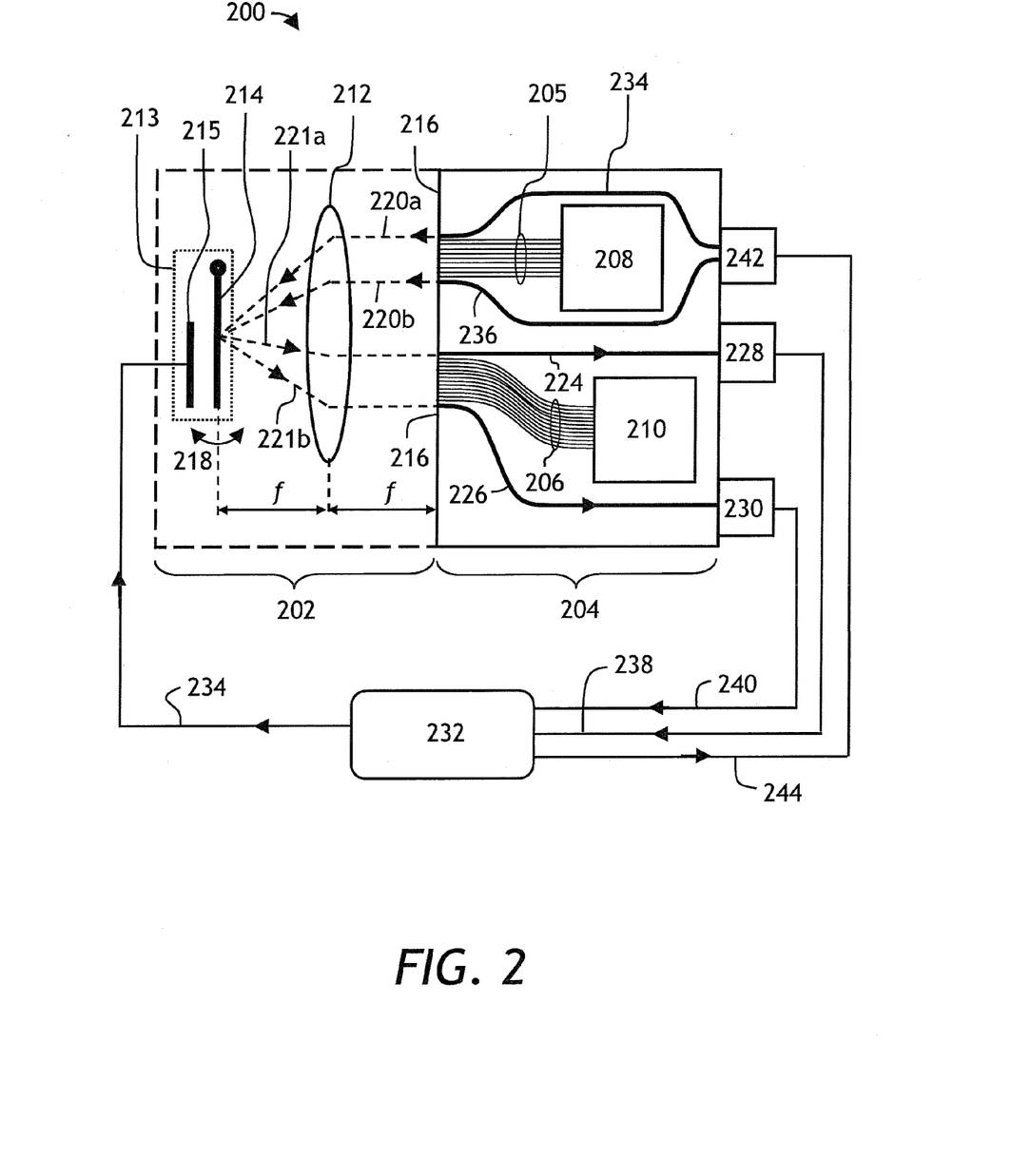
FIG. 2 is a circuit diagram of a hybrid MEMS-PLC optical module according to another preferred embodiment of present invention.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIG. 1 and FIG. 2, like numerals refer to like parts.

Turning now to FIG. 1, a hybrid MEMS-PLC optical module 100, usable for switching information-carrying optical signals in an optical network, is shown. The module 100 consists of a free space optical part 102 and a PLC part 104, wherein the free space optical part 102 provides optical switching between waveguides of an emitting waveguide array 105 and waveguides of a receiving waveguide array 106 of PLC 104. Generally speaking, PLC 104 may carry out a number of additional functions performed on input and output optical signals, such as wavelength multiplexing and demultiplexing, and, or attenuation. The regions of PLC 104 dedicated to performing such functions on input and output signals are symbolically shown by squares 108 and 110, respectively. The switching function is realized by means of free space optical part 102 comprising a lens 112 and a MEMS device 113. The MEMS device 113 consists of a tiltable MEMS mirror 114 and a MEMS actuator 115 tilting MEMS mirror 114 upon application of a voltage to MEMS actuator 115. The lens 112 has optical power and optically couples waveguides of the emitting array 105 to MEMS mirror 114, and MEMS mirror 114 to waveguides of the receiving array 106. Alternatively a concave mirror having optical power can be used instead of lens 112 in a different optical arrangement of elements. Lens 112 is located one focal length f away from the input/output facet 116 of the PLC chip 104, and MEMS mirror 114 is located one focal length f away from lens 112, where f is the focal length thereof. Lens 112 transforms an offset of an input beam into an angle of the beam at a focal plane of lens 112, and the angle of an input beam into an offset of the beam at said focal plane. Since the focal plane coincides with a plane of MEMS mirror 114, optical beams emitted by parallel waveguides of emitting array 105 will all cross at the middle of MEMS mirror 114, with each beam having a different angle of incidence onto MEMS mirror 114. The angle of incidence of a beam corresponds to a relative position of a waveguide which emitted the beam. MEMS mirror 114 redirects the beams so as to couple them to waveguides of the receiving waveguide array 106. For example, a beam 120 is redirected by mirror 114, which can tilt as indicated by arrows 118, so as to reflect at any angle between a path 121a and a path 121b, and fall onto the input/output facet 116 of PLC 104 anywhere within a range indicated by vertical arrows 122.

While the systems of prior art rely on a feedback loop to lock an output optical beam on a target fiber, the module 100 of present invention employs a referencing means built into module 100, to periodically calibrate MEMS device 113, so as to compensate for the above mentioned effects of long-term instability of MEMS device 113 and, for that matter, of entire free space optical part 102. Specifically, the referencing means includes a waveguide 124 optically coupled to a photodiode 128, a waveguide 126 optically coupled to a photodiode 130, and a controller 132 connected to MEMS device 113 with a line 134 and to both photodiodes 128 and 130 with lines 138 and 140. Both waveguides 124 and 126 are monolithically integrated on the sides of the input waveguide array 106. Controller 132 is suitably programmed to perform a periodic calibration of MEMS device 113 as follows. The calibration procedure starts by selecting an input beam 120, which carries an optical signal of a fiberoptic network, and applying a voltage to MEMS actuator 115, so as to tilt MEMS mirror 113 so that the beam 120 incident upon the MEMS mirror 114 reflects therefrom along path 121a and couples into waveguide 124. The voltage applied to MEMS actuator 115 is then adjusted by controller 132 so as to maximize an amount of light detected by photodiode 128 which is optically coupled to waveguide 124. Then, the procedure is repeated with respect to path 121b, waveguide 126, and photodiode 130. The two voltages corresponding to the maximum amounts of light detected by photodiodes 128 and 130 are then used to calculate, in the form of stored values, a calibration curve of MEMS device 115, which can be used to determine the voltages required to couple input beam 120 into any waveguide of the output waveguide array 106.

In order to save costs and, or reduce complexity of module 100, waveguides 124 and 126 can be alternatively routed to be coupled to the same photodiode, e.g. to photodiode 128. In that case, photodiode 130 and line 140 are not needed. Of course, this creates an uncertainty regarding which waveguide, i.e. waveguide 124 or waveguide 126, receives light detected by photodiode 128. However, this is normally not a problem since, unless MEMS device 113 drifted over most of its range, the proper waveguide can be identified from a magnitude of the voltage applied to MEMS actuator 115.

The angular sensitivity achievable by this calibration procedure is determined by the mode field diameter, ω, of waveguides 124 and 126, focal length f of lens 112, and the signal-to-noise of photodiodes 128 and 130. The insertion loss as a function of angle has the following Gaussian relationship, $$IL(\theta) = -10\log\left[\exp\left[-\left(\frac{\pi\theta f}{45\omega}\right)^2\right]\right]$$

where θ is the detuning from optimal coupling to a waveguide, in degrees.

Any algorithm for maximizing the amount of light detected by photodiode 128 or 130 can be employed. In general, input beam 120 has an unknown power level and is not necessarily stable. Photodiodes 128 and 130 must be capable of measuring optical power over the whole range of potential power levels of input signals. To deal with potential stability issues, a voltage applied to MEMS actuator 115 is dithered by controller 132, and a lock-in detection of signals from photodiodes 128 and 130 is used.

In those cases when not one but two waveguides carry an optical signal at a time when a calibration is required, both said waveguides can be used. In order to select suitable waveguides, MEMS mirror 114 is swept through its entire tilting range indicated by arrows 118, the amount of light in waveguides 124 and 126 being continuously monitored during the sweep by using photodiodes 128 and 130. Then, the waveguides of input waveguide array 105, producing strongest optical signals, are selected. Since relative position of all the waveguides is known, the two selected waveguides can be used for calibrating MEMS device 113. If more than two waveguides emit beams strong enough for calibration to be performed, then the two waveguides farthest from the center of emitting array 105 are preferably used. In this way, the calibration can be performed across a larger range of tilting of MEMS mirror 114.

Since emitting waveguides of array 105 and receiving waveguides of array 106 carry optical communications signals which should not be interrupted, the calibration procedure described above can only be performed whenever a switching of optical signals is requested which necessitates the interruption anyway. In certain cases, however, it is desirable to provide a possibility of calibrating a MEMS device even when there are no optical communications signals available, for example during a start-up of an optical network, or when the optical communications signals are too weak for the calibration to be reliably performed.

Turning now to FIG. 2, an embodiment of present invention is illustrated allowing for calibration of a tunable mirror with or without optical communications signals present. Similarly to module 100 of FIG. 1, a module 200 of FIG. 2 consists of a free space optical part 202 comprising a lens 212 and a MEMS device 213, and a PLC 204 comprising an emitting waveguide array 205, a receiving waveguide array 206, a section 208 performing additional input signal functions, and a section 210 performing additional output signal functions. The MEMS device 213 consists of a tiltable MEMS mirror 214 and a MEMS actuator 215 tilting MEMS mirror 214 upon application of a voltage to MEMS actuator 215. The referencing means of device 200 includes a pair of receiving calibrating waveguides 224 and 226 optically coupled to a pair of respective photodiodes 228 and 230, and a controller 232 connected to MEMS device 213 with a line 234 and to both photodiodes 228 and 230 with lines 238 and 240. What differs the referencing means of module 200 of FIG. 2 from the referencing means of FIG. 1 is a presence of a pair of emitting calibrating waveguides 234 and 236, monolithically incorporated on both sides of array 205 and optically coupled to a light emitting diode, or an LED 242, for providing calibrating optical signals. The LED 242 is energized by supplying an electric current through a line 244.

The calibration procedure starts by energizing LED 242 and applying a set of voltages to MEMS actuator 215 so as to tilt the MEMS mirror 214 and make a beam 220a reflect along paths 221a and 221b and couple into waveguides 224 and 226, respectively. The voltages applied to MEMS actuator 215 are adjusted so as to maximize amounts of light detected by photodiodes 228 and 230. Any algorithm for maximizing the amount of light detected by photodiodes 228 and 230 can be employed, preferably an algorithm using dithering and lock-in detection. Then, the procedure is repeated with beam 220b. The four voltages corresponding to the maximum amounts of light, detected by photodiodes 228 and 230 upon coupling light from emitting calibrating waveguides 234 and 236, can be used to calculate a calibration curve of MEMS device 213.

The apparatus of present invention preferably uses two to four dedicated waveguides on a PLC circuit for a periodic re-calibration to compensate for long-term drift of MEMS and free space optics. Since a PLC is a monolithic structure, the relative position of waveguides in a PLC does not change with time which makes the calibration procedure very reliable. Moreover, in order to introduce the calibration waveguides, only a minimal modification of a PLC circuit and associated electronics is required. This is very advantageous as compared to real-time feedback loop based systems of prior art which require an optical tap, a photodiode, and a feedback electronics for each output optical fiber.

Figure 3:
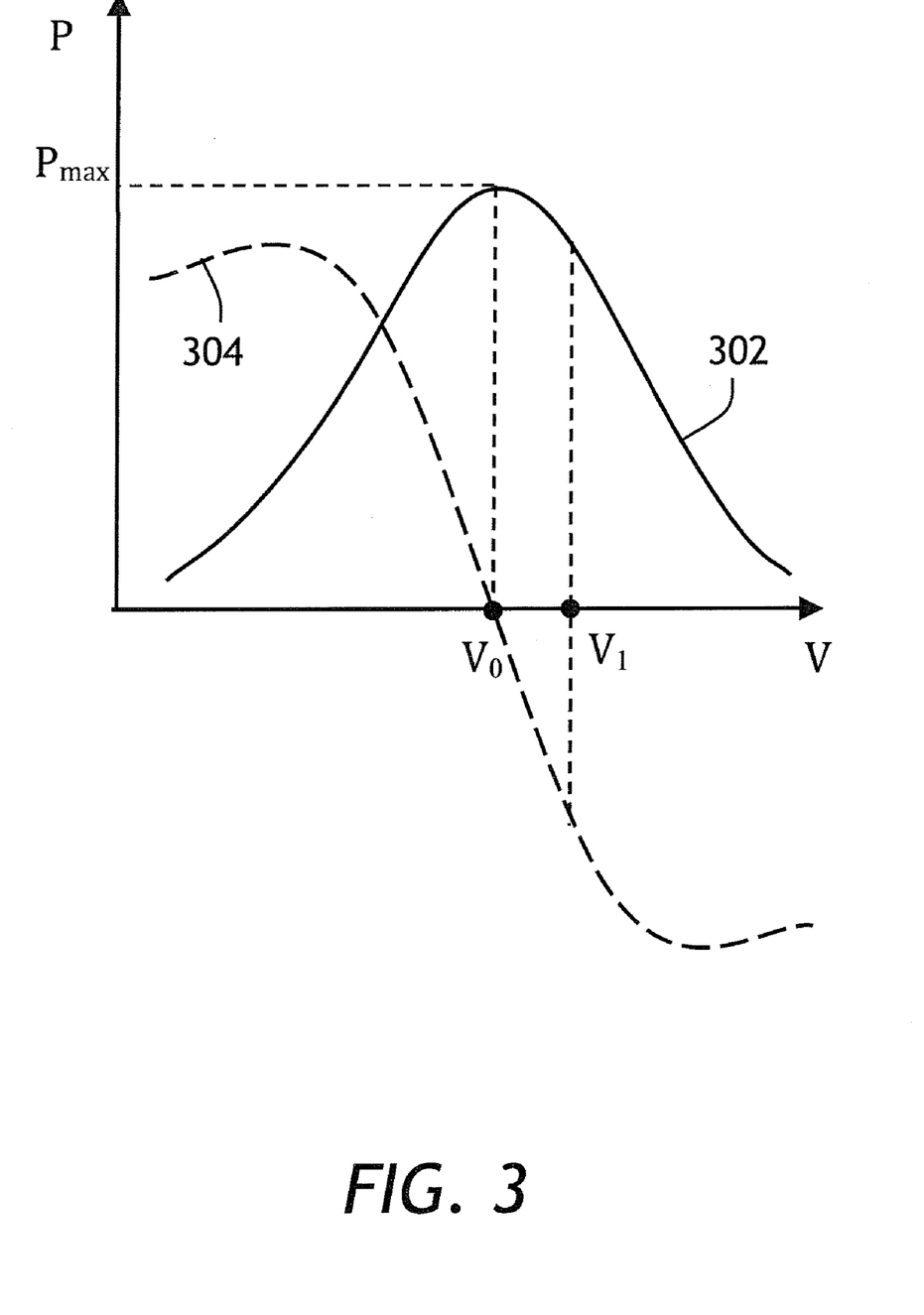
FIG. 3 is a plot of optical power versus voltage illustrating how a dithering can be employed to calibrate a MEMS device in an optical module.

As has been noted above, dithering a MEMS mirror can be used advantageously during calibration. The calibration seeks to establish a relationship between a driving voltage applied to a MEMS actuator and the tilt angle of a MEMS mirror, which governs the amplitude of an optical signal received by a receiving waveguide, in order to maximize said amplitude. Turning now to FIG. 3, a power P of an optical signal 302 and its derivative 304 are plotted as a function of a voltage V applied to a MEMS mirror. The shape of signal 302 is known, for example it can be Gaussian, therefore shape of derivative 304 is also known. When a tilt angle of a MEMS mirror, for example MEMS mirror 214 of FIG. 2 or MEMS mirror 114 of FIG. 1, is dithered, a photodetector, for example photodetector 228 of FIG. 2 or photodetector 128 of FIG. 1, receives an optical signal having a DC component and an AC component. The DC and AC components, the sign of the AC component depending on the phase of said component measured relative to the phase of dithering of a MEMS mirror, are proportional to optical signal 302 and its derivative 304 of FIG. 3, respectively. Since the shapes of curves 302 and 304 are known a priori, even a single-point measurement of both AC and DC components, performed at a voltage $V_1$ applied to a MEMS actuator, can, in principle, be used to calculate the voltage $V_0$ corresponding to the maximum optical signal $P_{max}$ coupled into a receiving calibrating waveguide. Moreover, $P_{max}$ can be calculated from a single-point measurement at point $V_1$ regardless of an amplitude of the optical signal used for calibration, provided that said amplitude is large enough to perform a measurement with sufficient signal-to-noise ratio. For example, in order to find $V_0$, one can divide a magnitude of a measured AC component in Volts by the magnitude of a measured DC component in Volts and obtain a dimensionless parameter which is independent of a strength of optical signal being used for calibration, wherein said parameter is indicative of $V_0$. Further, since the position of receiving waveguides in an array is known, one can, upon assumption of linearity of MEMS mirror tilting angle on applied voltage, calculate voltages corresponding to maximum optical signals coupled in any of the receiving waveguides. Yet still further, even when the dependence of MEMS mirror tilting angle on applied voltage is not linear, but of a known general shape characterized by k parameters, the calculation of voltages $V_0$ for receiving waveguides is still possible, if k calibrating measurements are performed with different combinations of emitting and receiving calibrating waveguides, as will be appreciated by those skilled in the art.

Whenever multiple measurements of the DC and AC components of a photodetector signal can be performed at a set of voltages applied to a MEMS actuator, given measurement time limitations, it is preferable that they are performed in order to increase the accuracy of determining the voltage $V_0$ corresponding to the maximum optical signal $P_{max}$. Further, after $V_0$ has been calculated for a calibrating receiving waveguide, it is preferable that said voltage is applied to a MEMS mirror being calibrated, so as to check whether the maximum optical power $P_{max}$, indeed, is observed in a calibrating receiving waveguide at $V_0$.

The calibration may be performed at a start-up of the device, at a shut-down of the device, or upon receiving a request for re-directing a signal from one output waveguide to another. In those cases when a measurable signal is present in calibrating receiving waveguides during normal operation of the device, such as in waveguides 124 and 126 of FIG. 1 or waveguides 224 and 226 of FIG. 2, the procedure of calibration involving dithering can be performed without interrupting data signals, by simply dithering the tilt angle of a MEMS mirror and measuring said DC and AC components of an optical signal in calibrating receiving waveguides. Further, a uniaxial MEMS, i.e. a MEMS with movement of a mirror around a single axis, or a bi-axial MEMS, i.e. a MEMS with movement of a mirror around two perpendicular axes, can be calibrated using methods of the present invention. The amount of the emitting and the receiving calibrating waveguides can vary from one waveguide up to many waveguides. It is also understood that, even though the exemplary embodiments describe a MEMS-PLC hybrid structure, it is possible to perform a calibration, in the spirit of present invention, of devices containing fiber arrays and/or other types of tiltable mirrors, e.g. galvo- or piezo-driven mirrors.

In the forthcoming paragraphs, a detailed description of algorithms suitable for programming a controller of a MEMS-based optical module, according to the present invention, will be given.

Figure 4:
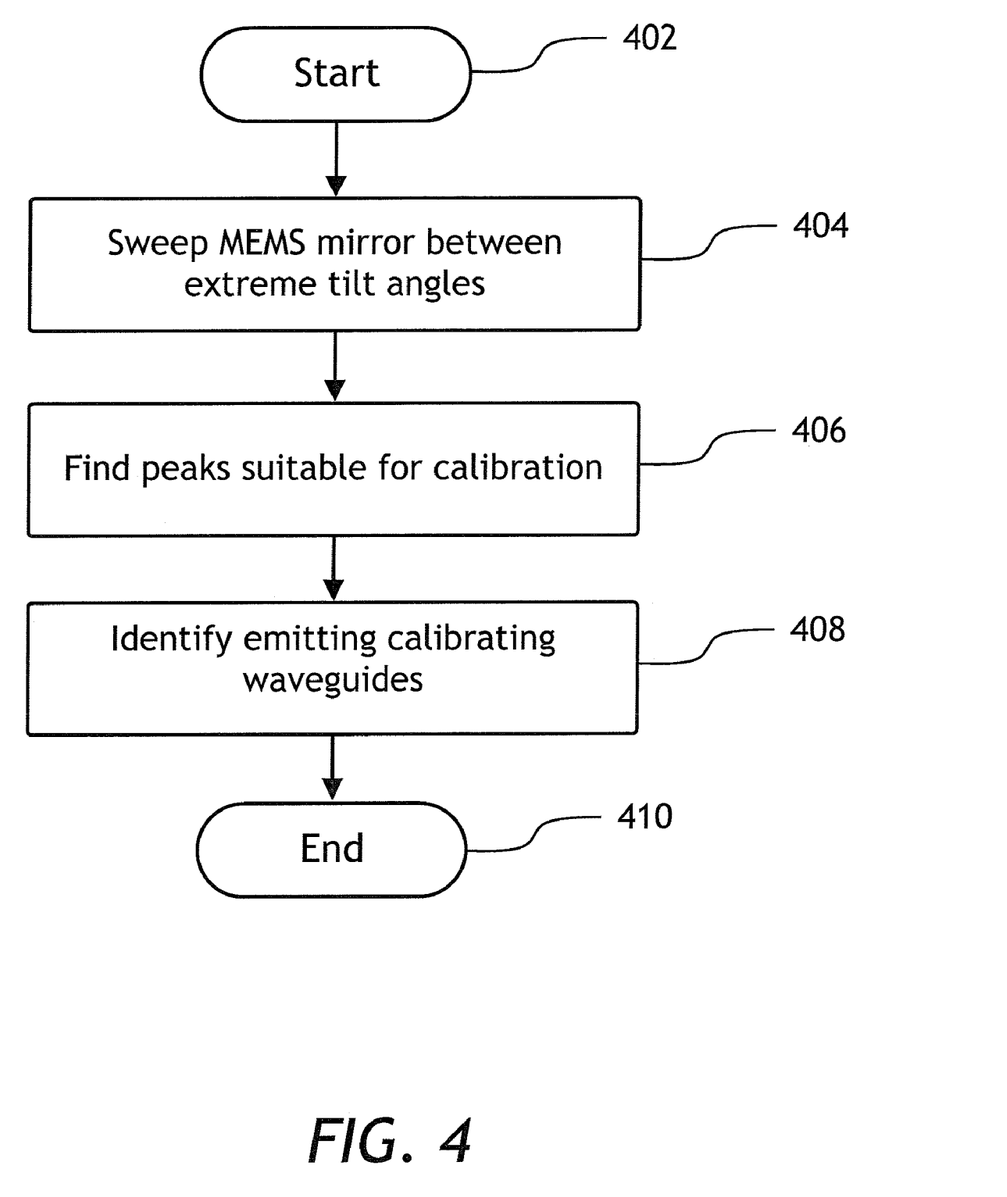
FIG. 4 is a flow chart illustrating an algorithm for selecting suitable emitting calibrating waveguides.

Turning now to FIG. 4, an algorithm for selecting emitting calibrating waveguides for calibration of a MEMS device in an optical module of FIG. 1 is shown. The algorithm starts at a point 402. At a step 404, a MEMS mirror is swept across the entire range of tilt angles by sweeping the voltage applied to a MEMS actuator, while the optical power of light coupled into calibrating receiving waveguides is monitored. At a step 406, the algorithm searches for values of voltage corresponding to peaks of optical power. At a step 408, the emitting calibrating waveguides, corresponding to values of applied voltage corresponding to the peaks detected at step 406, are identified. After the waveguides have been identified, the procedure of FIG. 4 ends at a point 410.

Figure 5:
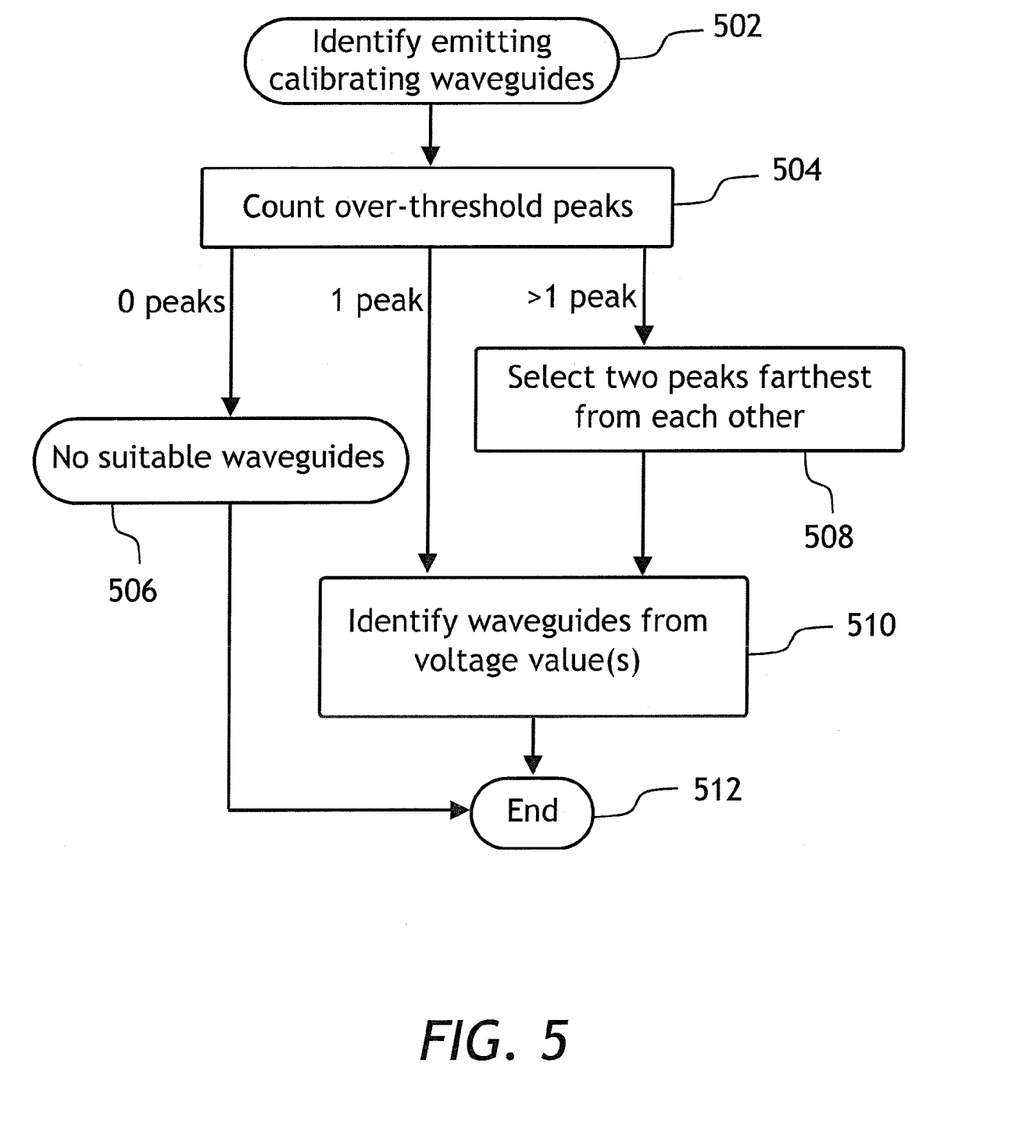
FIG. 5 is a flow chart illustrating one aspect of the algorithm for selecting suitable emitting calibrating waveguides.

Turning now to FIG. 5, a detailed algorithm for step 408 of FIG. 4 is presented. At a point 502, the algorithm is started. At a step 504, the peaks of optical power are discriminated against a threshold, and over-threshold peaks are counted. If no peaks higher than a threshold are detected, as a block 506 indicates, then there are no suitable waveguides, and the calibration cannot be performed. If there is more than two over-threshold peaks, then two peaks located farthest from each other, are selected, as indicated by a step 508. Then, at a step 510, the emitting waveguides, corresponding to the peaks detected, are identified by referring to a look-up table listing voltages required to couple light from a particular emitting waveguide into a particular calibrating receiving waveguide. The end of the algorithm is marked by a step 512.

Figure 6:
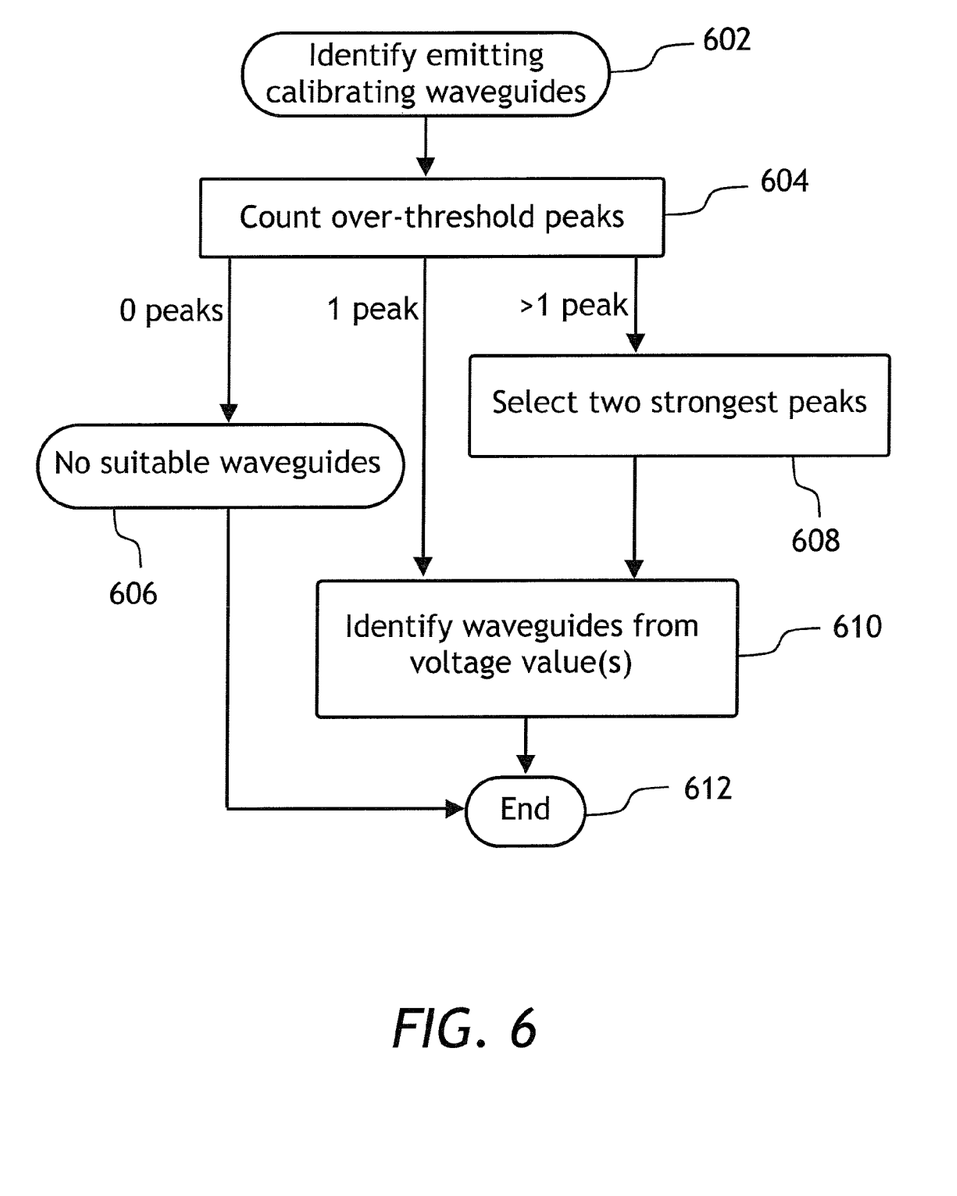
FIG. 6 is a flow chart illustrating another, alternative aspect of the algorithm for selecting suitable emitting calibrating waveguides.

Turning now to FIG. 6, an alternative algorithm for step 408 of FIG. 4 is presented. Similarly to FIG. 5, it consists of a starting step 602, a counting step 604, a negative conclusion step 606, a waveguide determining step 610, and the ending step 512. What differs the algorithm of FIG. 6 from the one of FIG. 5 is that, at a step 608, two strongest peaks, i.e. two peaks with the highest amplitude, are selected.

Figure 7:
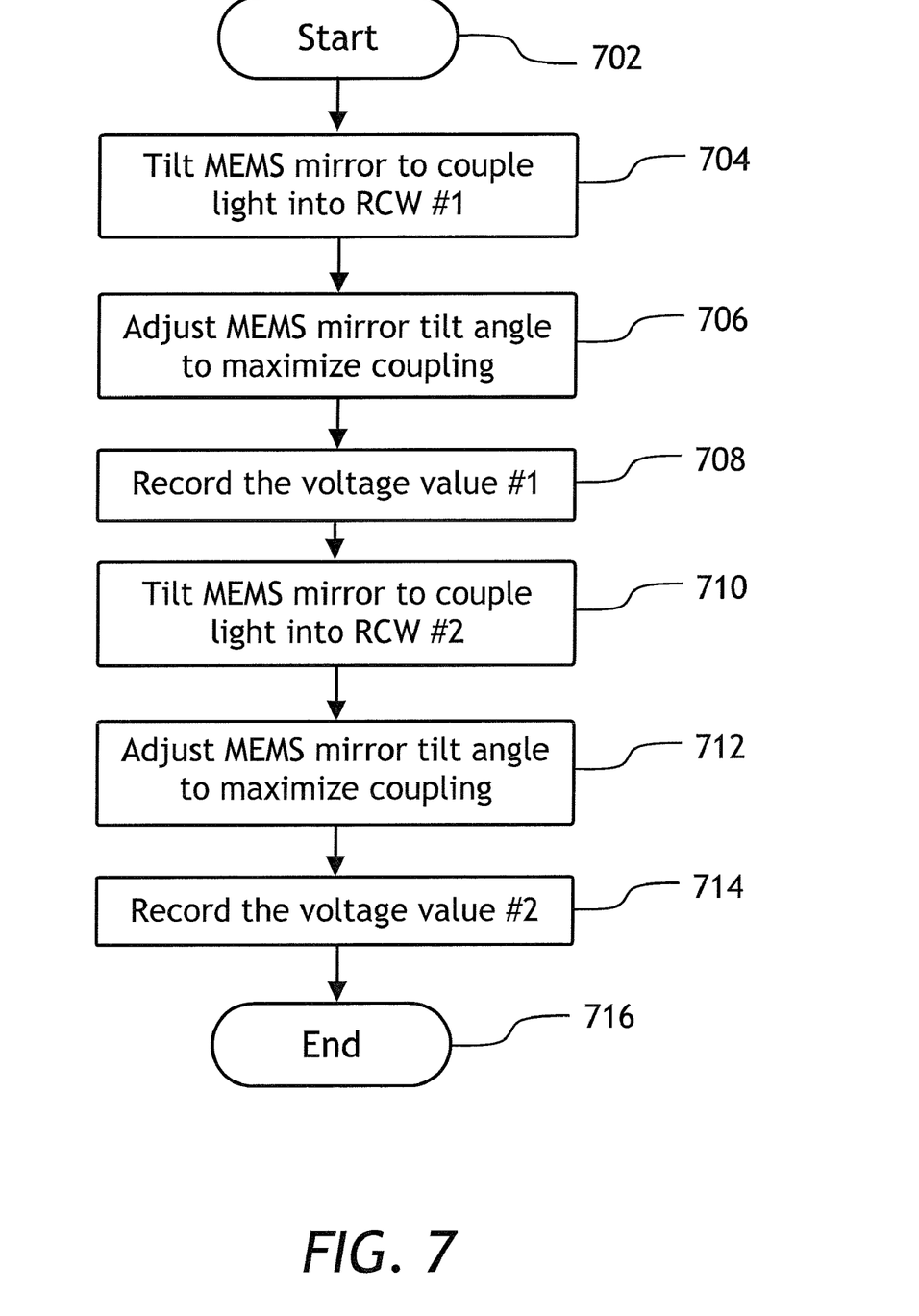
FIG. 7 is a flow chart illustrating an algorithm for a MEMS device calibration according to one preferred embodiment of the present invention.

Turning now to FIG. 7, a block diagram of an algorithm for programming controller 132 of an optical module of FIG. 1, or controller 232 of the optical module of FIG. 2, is illustrated. The algorithm starts at a point 702. At a step 704, the MEMS mirror is tilted so as to couple light from a emitting calibrating waveguide which, as has been described above, can be either a waveguide identified during the steps of FIGS. 4 to 6, or a dedicated emitting calibrating waveguide, into a first calibrating receiving waveguide. Then, at a step 706, the MEMS mirror tilt angle is adjusted, by adjusting the voltage applied to a MEMS actuator, so as to maximize coupling of light into the calibrating receiving waveguide. The value of the voltage corresponding to the maximum is recorded in controller's memory at a step 708. Then, at steps 710-714, the procedure repeats for the other receiving calibrating waveguide. Then, at a final point 716, the procedure ends.

Figure 8:
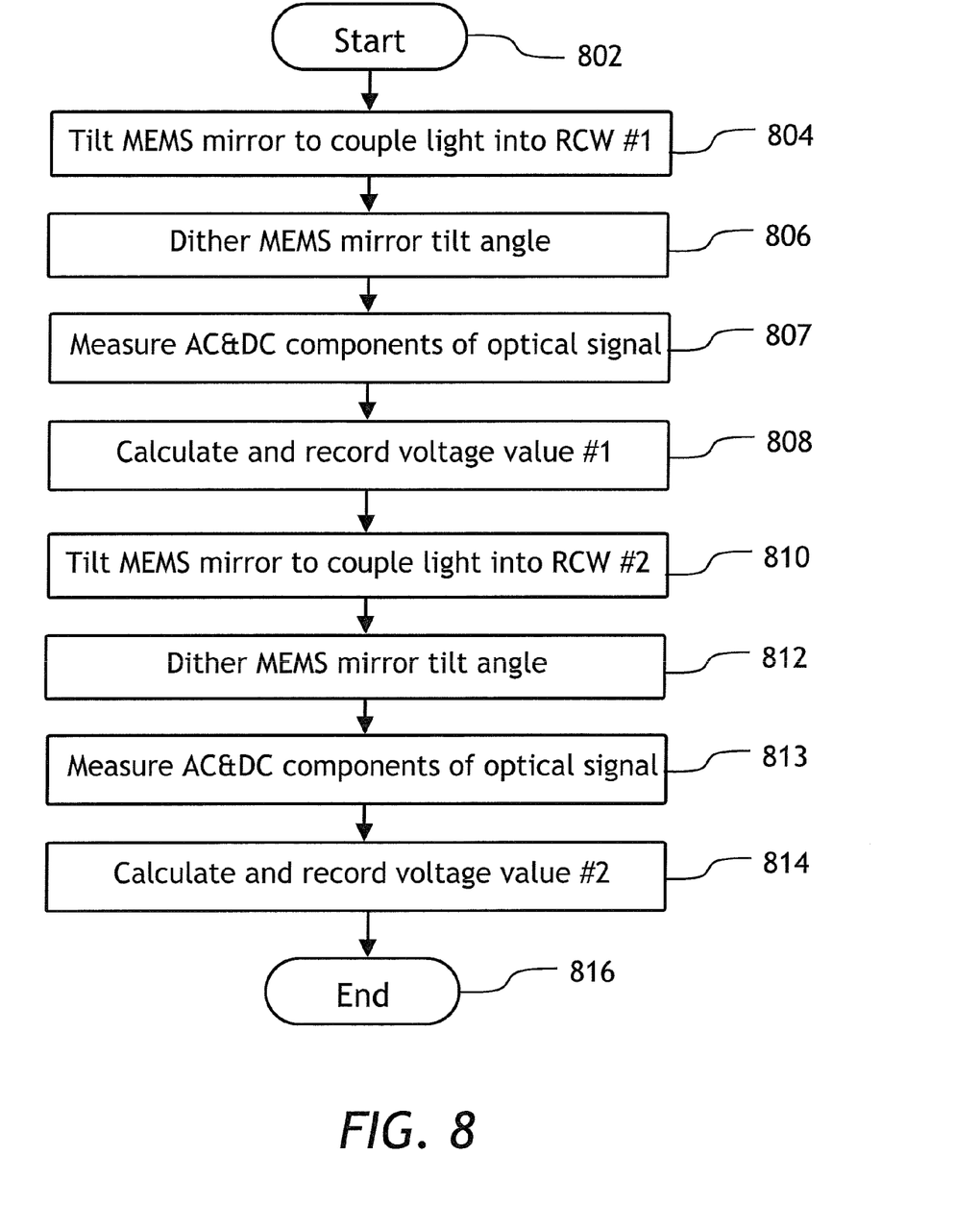
FIG. 8 is a flow chart illustrating an algorithm for a MEMS device calibration according to another preferred embodiment of the present invention.

Turning now to FIG. 8, a block diagram of an alternative algorithm for programming controller 132 or 232, is shown. The algorithm starts at a point 802. Similarly to algorithm of FIG. 7, at a step 804 of FIG. 8 the MEMS mirror is tilted so as to couple light from a emitting calibrating waveguide, into a first receiving calibrating waveguide. Then, at a step 806, the MEMS mirror is dithered, and, at a step 807, the AC and DC components of the optical signal in the receiving calibrating waveguide are measured. Then, at a step 808, instead of searching for a voltage value corresponding to the maximum optical power, said value is calculated from the AC and DC components, as has been explained during discussion of FIG. 3. At steps 810-814, the procedure is repeated for the second receiving calibrating waveguide. Point 816 marks the end of the procedure.

Figure 9:
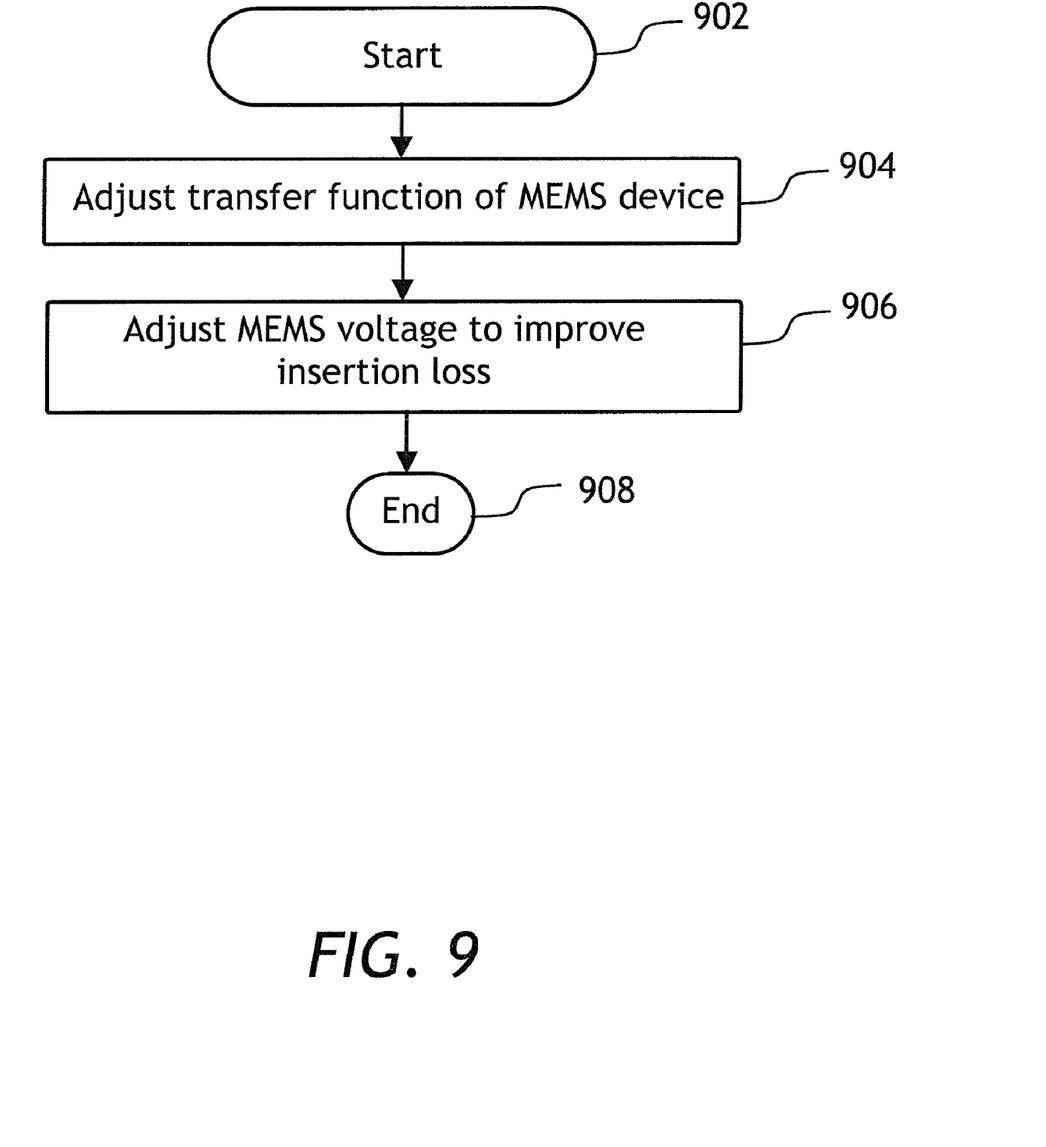
FIG. 9 is a flow chart illustrating an algorithm for improving insertion loss of an optical module according to the present invention.

After the steps of the algorithm of FIG. 7 or of FIG. 8 are performed and the values of voltage corresponding to the maximum coupled optical power are found, a transfer function of a MEMS device, i.e. a dependence of a tilt angle of the MEMS mirror on a voltage applied to the MEMS actuator, can be adjusted. The adjusted transfer function can be used to improve, or lessen, the insertion loss of a MEMS based optical module. FIG. 9 shows the steps involved. At a starting point 902, the voltage values of FIG. 7 or FIG. 8 are already found as has been described above. The transfer function is adjusted at a step 904, and the voltage applied to the MEMS actuator is adjusted at a step 906. A point 908 marks the end of the procedure.

Figure 10:
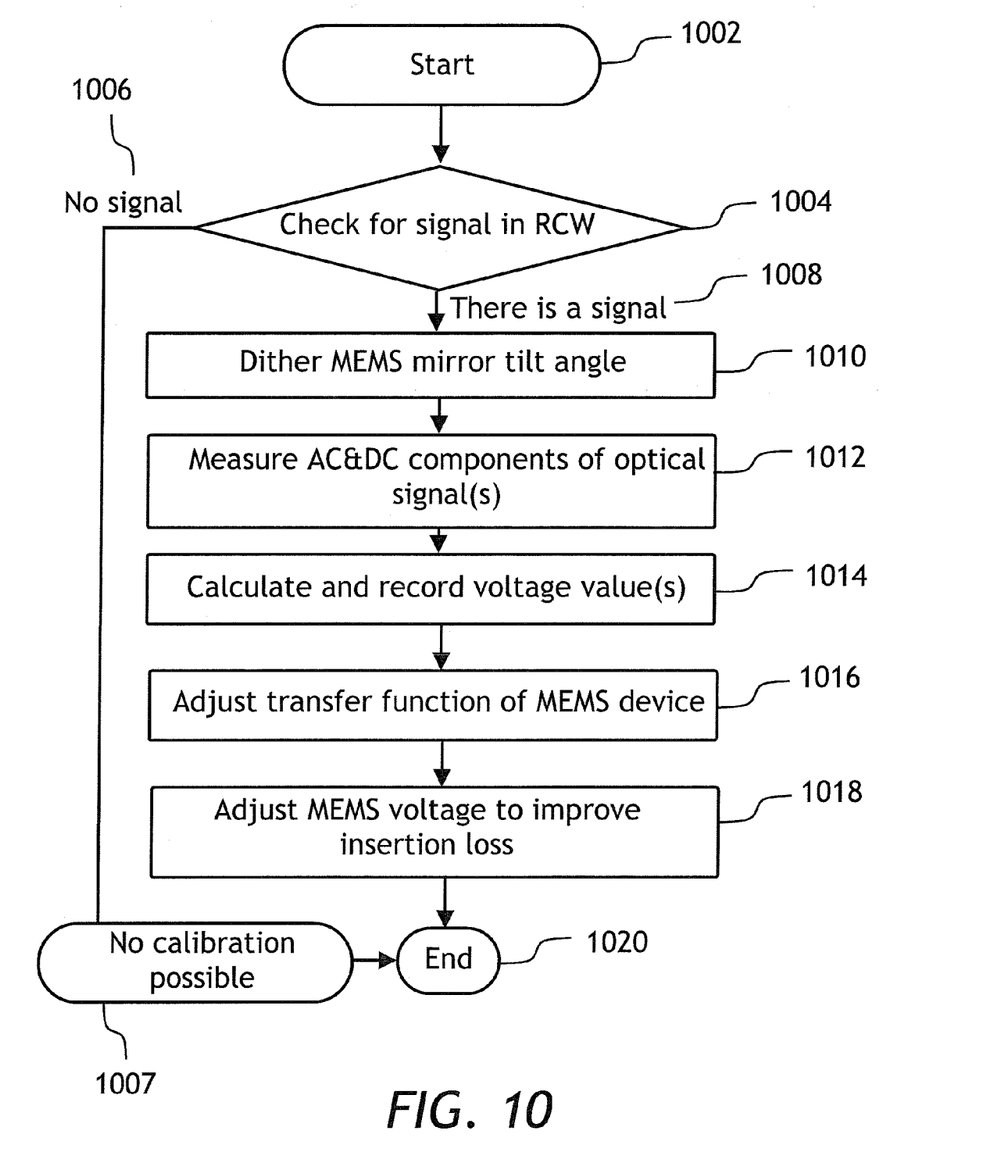
FIG. 10 is a flow chart illustrating an algorithm for a MEMS device calibration and improving the insertion loss according to yet another preferred embodiment of the present invention.

Turning now to FIG. 10, a block diagram of yet another alternative algorithm for programming controller 132 or 232 is shown. The algorithm of FIG. 10 describes a calibration procedure of a MEMS device which does not require sweeping MEMS mirror over its entire range of tilting angles and, therefore, can be performed without disrupting flow of optical signals from an input to an output waveguide of the optical module of the present invention. The procedure starts at a point 1002. At a decision point 1004, a check is performed for presence of an optical signal of an adequate magnitude in at least one of receiving calibrating waveguides. If there is no adequate signal in either of the waveguides, as indicated by a point 1006, then, as a block 1007 shows, no calibration is possible, and a calibration of FIG. 7 or FIG. 8, involving tilting MEMS mirror, has to be performed instead. If, however, there is a signal, as indicated by point 1008, the MEMS mirror is dithered at a step 1010, and AC and DC components of the optical signal are measured at a step 1012. Then, at a step 1014, the voltage values, corresponding to maximum optical coupling, are calculated, and, at a step 1016, the transfer function of the MEMS device is adjusted. Then, at a step 1018, the voltage applied to the MEMS actuator, is adjusted, so as to improve the insertion loss of the optical module. The procedure ends at step 1020.

What is claimed is:

1. A method of calibrating a micro-electro-mechanical (MEMS) device having a MEMS mirror for reflecting light, and a MEMS actuator for tilting the MEMS mirror in response to an applied voltage having a voltage value, the method comprising:
providing m emitting waveguides for emitting light, wherein m is an integer positive number;
providing n receiving waveguides for receiving light, wherein n is an integer positive number, and wherein each receiving waveguide has two first and second ends, and wherein the first end of each receiving waveguide is available for receiving light, and wherein the second end of each receiving waveguide is optically coupled to a photodetector for measuring the power of light impinging thereon;

providing a coupler for coupling a light emitted by any one of the m emitting waveguides to the MEMS mirror, and for coupling the light reflected from the MEMS mirror into a particular of the n receiving waveguides in dependence upon an angle of tilt of the MEMS mirror;

applying up to m*n voltage values to the MEMS actuator, wherein m*n>1, and, for each voltage value applied, measuring the power of light emitted from one of m emitting waveguides and coupled into one of n receiving waveguides, wherein said powers of light are measured using the respective photodetectors;

determining a relationship between an angle of tilt of the MEMS mirror and a voltage applied to the MEMS actuator, from the applied voltage values and the measured values of power of light.

2. A method of claim 1, wherein the determined relationship between an angle of tilt of the MEMS mirror and a voltage applied to the MEMS actuator is utilized to compensate for: a drift of the angle of tilt of the MEMS mirror; or a drift of an optomechanical package comprising the MEMS device; or both.

3. A method of claim 1, wherein the up to m*n voltage values are adjusted so as to maximize the power of light emitted from one of m emitting waveguides and coupled into one of n receiving waveguides.

4. A method of claim 1, wherein the applied voltage values have each a DC component and an AC component, and the measured values of power of light have each a DC component and an AC component, and wherein said determination is based on the DC and the AC components of the applied voltages and of the measured values of power of light.

5. A method of claim 1, wherein m=1, n=2.

6. A method of claim 1, wherein m=2, n=2.

7. A method of claim 1, wherein the emitting and the receiving waveguides are a part of a planar lightwave circuit.

8. A method of claim 5, wherein the two receiving waveguides form a part of, and are disposed on both sides of a planar array of waveguides.

9. A method of claim 5, wherein the emitting waveguide is a waveguide carrying an optical signal of a fiberoptic network.

10. A method of claim 9, wherein the two receiving waveguides form a part of a planar lightwave circuit having a waveguide array, and wherein the two receiving waveguides are embedded monolithically on both sides of the waveguide array.

11. A method of claim 6, wherein the two emitting waveguides form a part of, and are disposed on both sides of a first planar array of waveguides, and the two receiving waveguides form a part of, and are disposed on both sides of a second planar array of waveguides.

12. A method of claim 6, further comprising providing a light emitting diode for providing an output light, wherein the two emitting waveguides are disposed to receive said light.

13. A method of claim 12, wherein the emitting and the receiving waveguides form a part of a planar lightwave circuit having a first waveguide array for providing input functions and a second waveguide array for providing output functions, and wherein the two emitting waveguides are embedded monolithically on both sides of the first waveguide array, and the two receiving waveguides are embedded monolithically on both sides of the second waveguide array.

14. A method of claim 1, wherein:
said MEMS device is a part of an optical switching module having an insertion loss;
said calibration is performed at a start-up of the module, and, or at a shut-down of the module, and, or upon receiving a switching command; and
wherein the method further comprises applying a voltage to the MEMS actuator such that the relationship between an angle of tilt of the MEMS mirror and the applied voltage, determined upon said calibration, is utilized, so as to lessen the insertion loss of the optical module.

15. A method for lessening an insertion loss of an optical module including: a mirror and an actuator for tilting said mirror in response to applying a control signal to the actuator; an emitting planar array of waveguides for emitting light; a receiving planar array of waveguides for receiving light; and a coupler for coupling a light emitted by a waveguide of the emitting planar array to the mirror, and for coupling the light reflected from the mirror to a waveguide of the receiving planar array, wherein the module is usable for routing an optical signal from a waveguide of the emitting planar array into a waveguide of the receiving planar array, wherein the method comprises:

dithering the control signal applied to the actuator and measuring AC and DC components of the power of light coupled into any of two, or both outer waveguides of the receiving planar array;

determining, from said AC and DC components of the power of light, a value of a control signal which, when applied, would reduce the insertion loss of the optical module; and applying the control signal of said value to the actuator;

wherein the actuator is selected from a group consisting of: a micro-electro-mechanical (MEMS) actuator; a galvo actuator; and a piezo actuator.

16. A MEMS actuated optical module comprising:
an emitting waveguide for emitting light;
a planar array of receiving waveguides for receiving the light from the emitting waveguide;
a MEMS device including a MEMS mirror and a MEMS actuator, for tilting the MEMS mirror in response to a voltage applied;
a coupler for coupling light from the emitting waveguide to the MEMS mirror, and for coupling the light reflected from the MEMS mirror to a selected one of the waveguides of the planar array of receiving waveguides in dependence upon an angle of tilt of the MEMS mirror, wherein said coupling is characterized by a coupling loss; and
a calibration unit for calibrating the optical module, comprising:
first and second calibrating waveguides disposed on both sides of the planar array of receiving waveguides, wherein each said calibrating waveguide has first and second ends, wherein the first end of each calibrating waveguide is available for receiving light, and wherein the second end of each calibrating waveguide is optically coupled to a photodetector for measuring the power of light impinging thereon, and
a suitably programmed processor for calibrating the MEMS device.

17. A MEMS actuated optical module comprising:
a planar array of emitting waveguides for emitting light;
a planar array of receiving waveguides for receiving the light from the planar array of emitting waveguides;

a MEMS device including a MEMS mirror and a MEMS actuator, for tilting the MEMS mirror in response to a voltage applied;

a coupler for coupling light from a selected one of the waveguides of the planar array of emitting waveguides to the MEMS mirror, and for coupling the light reflected from the MEMS mirror to a selected one of the waveguides of the planar array of receiving waveguides in dependence upon an angle of tilt of the MEMS mirror, wherein said coupling is characterized by a coupling loss; and a calibration unit for calibrating the optical module, comprising:

first and second emitting calibrating waveguides disposed on both sides of the planar array of emitting waveguides, wherein each said emitting calibrating waveguide has first and second ends, wherein the first end of each emitting calibrating waveguide is available for emitting light, and wherein the second end of at least one of the emitting calibrating waveguides is optically coupled to a light emitting diode for providing an output light;

first and second receiving calibrating waveguides disposed on both sides of the planar array of receiving waveguides, wherein each receiving calibrating waveguide has first and second ends, wherein the first end of each receiving calibrating waveguide is available for receiving light, and wherein the second end of each receiving calibrating waveguide is optically coupled to a photodetector for measuring the power of light impinging thereon, and a suitably programmed processor for calibrating the MEMS device.

18. An optical module of claim 16, wherein the processor has access to:

a plurality of stored values of voltage applied to the MEMS actuator, and the plurality of respective stored values of power of light emitted from an emitting waveguide and coupled into a receiving waveguide upon application of said values of voltage, for calibrating the MEMS device; and wherein the processor has a means for calculating, from said values of voltage and respective values of power of light, a relationship between an angle of tilt of the MEMS mirror and a voltage applied to the MEMS actuator.

19. An optical module of claim 18, wherein said values of voltage are chosen so as to maximize said values of power of light.

20. An optical module of claim 18, wherein said values of voltage have a DC and an AC components, and said values of power of light have a DC and an AC components, and wherein said calculation is based on the DC and the AC components of said values of voltage and of said values of power of light.

21. An optical module of claim 18, wherein all said arrays and waveguides are a part of a planar lightwave circuit, and wherein at least one array of waveguides comprises an arrayed waveguide grating.

22. An optical module of claim 21, wherein the coupler has a focal length, and wherein the coupler is disposed one focal length away from the planar lightwave circuit, and the MEMS mirror is disposed one focal length away from the coupler, and wherein the coupler comprises a lens or a concave mirror.

* * * * *